(12) United States Patent
Otosaka et al.

(10) Patent No.: US 7,752,869 B2
(45) Date of Patent: Jul. 13, 2010

(54) OPTICAL FIBER PREFORM, METHOD FOR MANUFACTURING THEREOF, AND OPTICAL FIBER OBTAINED BY DRAWING THEREOF

(75) Inventors: Tetsuya Otosaka, Gunma-ken (JP); Dai Inoue, Gunma-ken (JP); Hiroshi Oyamada, Gunma-ken (JP); Jun Abe, Gunma-ken (JP); Hideo Hirasawa, Gunma-ken (JP)

(73) Assignee: Shin-Etsu Chemical Co., Ltd., Chiyoda-ku, Tokyo (JP)

( * ) Notice: Subject to any disclaimer, the term of this patent is extended or adjusted under 35 U.S.C. 154(b) by 1160 days.

(21) Appl. No.: 11/133,193

(22) Filed: May 20, 2005

(65) Prior Publication Data
US 2005/0229639 A1    Oct. 20, 2005

Related U.S. Application Data

(62) Division of application No. 10/634,779, filed on Aug. 6, 2003, now abandoned.

(30) Foreign Application Priority Data

Aug. 7, 2002    (JP) ............................. 2002-230380

(51) Int. Cl.
  *C03B 37/018*    (2006.01)
(52) U.S. Cl. ............................. 65/412; 65/413; 65/421
(58) Field of Classification Search ............. 65/412, 65/426, 413, 414, 415, 421, 428
See application file for complete search history.

(56) References Cited

U.S. PATENT DOCUMENTS

| | | | |
|---|---|---|---|
| RE30,883 E | 3/1982 | Rau et al. | |
| 4,664,474 A | 5/1987 | Tanaka et al. | |
| 4,874,416 A * | 10/1989 | Yokokawa et al. | ............ 65/382 |
| 5,067,793 A | 11/1991 | Bachmann et al. | |
| 5,364,429 A | 11/1994 | Le Sergent | |
| 5,412,672 A | 5/1995 | Ainslie et al. | |
| 5,578,106 A | 11/1996 | Fleming, Jr. et al. | |
| 6,116,055 A | 9/2000 | Ishikawa et al. | |
| 6,205,268 B1 | 3/2001 | Chraplyvy et al. | |

(Continued)

FOREIGN PATENT DOCUMENTS

DE    3820217 A1    12/1989

(Continued)

OTHER PUBLICATIONS

JP 08-208259 Machine translation, Oh et al. An Optical Fiber Preform Having Different Thermal Conductivities by Sectorial Directions and Its Production. Aug. 13, 1996.*

(Continued)

*Primary Examiner*—Steven P Griffin
*Assistant Examiner*—Queenie Dehgan
(74) *Attorney, Agent, or Firm*—McGinn IP Law Group, PLLC

(57) ABSTRACT

A method for manufacturing a preform having a core and a multilayer clad, includes covering a circumference of a rod including at least the core and an inner clad layer with a first tube including at least a high viscosity clad layer, and unifying the rod and the first tube by heating and contracting the first tube.

11 Claims, 7 Drawing Sheets

U.S. PATENT DOCUMENTS

| | | |
|---|---|---|
| 6,622,527 B2 | 9/2003 | Schotz et al. |
| 6,776,012 B2 | 8/2004 | Chang et al. |
| 2002/0006256 A1 | 1/2002 | Inagaki et al. |
| 2002/0136515 A1 | 9/2002 | Schaper et al. |
| 2002/0170320 A1 | 11/2002 | Schotz et al. |
| 2003/0019245 A1* | 1/2003 | Drouart et al. .............. 65/414 |
| 2003/0024276 A1 | 2/2003 | Anderson et al. |

FOREIGN PATENT DOCUMENTS

| | | | |
|---|---|---|---|
| EP | 0762159 A | | 3/1995 |
| EP | 1209497 A | | 5/2002 |
| JP | 55100233 A | * | 7/1980 |
| JP | 62-191432 | | 8/1987 |
| JP | 1-160840 | | 6/1989 |
| JP | 2-81004 | | 3/1990 |
| JP | 8-208259 | | 8/1996 |
| JP | 2001/253726 A | | 6/2002 |
| KR | 2001-0010769 | | 2/2001 |
| KR | 2001-0040032 | | 5/2001 |

OTHER PUBLICATIONS

Canadian Office Action dated Jan. 20, 2006.
Taiwanese Office Action/Search Report dated May 12, 2008 with an English translation.
Canadian Office Action dated Sep. 29, 2006.
Office Action/Search Report dated May 6, 2009.
European Search Report mailed February 9, 2006.

* cited by examiner

OPTICAL FIBER PREFORM, METHOD FOR MANUFACTURING THEREOF, AND OPTICAL FIBER OBTAINED BY DRAWING THEREOF

The present Application is a Divisional Application of U.S. patent application Ser. No. 10/634,779 filed on Aug. 6, 2003 now abandoned.

The present application claims priority from a Japanese Patent Application No. 2002-230380 filed on Aug. 7, 2002, the contents of which are incorporated herein by reference.

BACKGROUND OF THE INVENTION

1. Field of the Invention

The present invention relates to an optical fiber preform with a small transmission loss of light at wavelength of 1385 nm and small rise of the transmission loss caused by a hydroxy (OH) group in case of being exposed to hydrogen atmosphere, a method for manufacturing the optical fiber preform, and an optical fiber obtained by drawing the optical fiber preform.

2. Description of the Related Art

FIG. 1 shows an example of the configuration of a conventional optical fiber preform sintering apparatus 100. The sintering apparatus 100 has a container 14, a heater 22, a gas introduction pipe 24, and a drive source 16. The container 14 is made from silica glass. A heater 22 is arranged around the container 14 to heat the container 14.

The gas introduction pipe 24 is connected to the bottom part of the container 14, and the mixed gas, which contains inert gas such as helium (He) gas and dehydration-reaction-gas such as chlorine ($Cl_2$) gas, is introduced into the container 14 through the gas introduction pipe 24.

An exhaust pipe 20 is connected to the top part of the container 14, and the mixed gas which travels through the container 14 from the bottom part of the container 14 is discharged from the exhaust pipe 20. The drive source 16 is provided in the upper part of the sintering apparatus 100. The drive source 16 is connected to a core rod 10.

The optical fiber preform 12 is formed around the circumference of the core rod 10 by such as VAD method before the dehydration process. The drive source 16 inserts the preform 12 into the container 14 by descending the core rod 10 into the container 14. The container 14 is filled with the atmosphere of the mixed gas, which flowed from the gas introduction pipe 24, and the circumference of the container 14 is heated by the heater 22. Therefore, the preform 12 inserted into the container 14 is heated under a mixed gas atmosphere to be dehydrated and sintered.

FIG. 2 shows relationship between a transmission loss and wavelength in a conventional general single mode optical fiber. Wavelength of light used in communication is mainly about 1300 nm or about 1550 nm because an inexpensive semiconductor laser can be used. As WDM (Wavelength Division Multiplexing) technology advances, light at wavelength band from 1300 nm to 1600 nm needs to be used in order to raise data-transmission capacity.

However, as shown in FIG. 2, the transmission loss in a general optical fiber rises sharply in wavelength of about 1385 nm. As the transmission loss becomes greater, the regenerator for amplifying and regenerating light needs to be added for a long distance transmission, which results in that cost of the whole transmission or communication system rises.

Accordingly, it is necessary to suppress an abrupt increase of the transmission loss at wavelength of about 1385 nm.

In addition, as shown in FIG. 2, a difference between a peak value of the transmission loss at wavelength of about 1385 nm and a value of the transmission loss in a case of decreasing gradually as shown by a broken line is defined as an OH peak hereinafter. For example, the OH peak shown in FIG. 2 is about 0.06 dB/km. The sharp rise or abrupt increase of the transmission loss at wavelength of about 1385 nm, i.e. the OH peak is caused by vibration of the OH group contained in the optical fiber and absorbing light of that wavelength. In order to decrease the OH group in the optical fiber, it is necessary to decrease the OH group in the preform which is a base material of the optical fiber.

Furthermore, even if the OH peak in the optical fiber just after drawing is sufficiently small, there is a possibility that the OH peak rises by hydrogen diffusing in the optical fiber, and reacting to a defect in a glass of the optical fiber, and then generating the OH group, if the optical fiber is exposed to hydrogen atmosphere for some reasons.

In FIG. 3, a dotted line shows a spectrum of the transmission loss in case that the optical fiber, the OH peak of which is sufficiently small as shown by a solid line, is exposed to atmosphere of 1% hydrogen for four days. FIG. 3 shows a rise of 0.1 dB/km of the OH peak at wavelength of about 1385 nm. The OH peak at wavelength of about 1240 nm is caused by hydrogen diffusing in the optical fiber. The OH peak disappears if the optical fiber is exposed to atmospheric air for a while and hydrogen is removed from the optical fiber. However, the rise of the OH peak at wavelength of about 1385 nm is irreversible and does not decrease. Therefore, the defect that causes the rise of the OH peak in the optical fiber needs to be reduced sufficiently.

SUMMARY OF THE INVENTION

Therefore, it is an object of the present invention to provide an optical fiber preform, a method for manufacturing thereof, and an optical fiber obtained by drawing thereof, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, assuming $T_s$ to be a temperature at which the maximum value $V_0$[log (poise)] of a radial viscosity distribution of the optical fiber in an inside area is 7.60[log(poise)], in the inside and an outside area equivalent to two times of mode field diameter, in which light at wavelength of about 1385 nm propagates in the optical fiber obtained by drawing the preform, the preform of the present invention is that the maximum value $V_0$[log (poise)] of radial viscosity distribution of the optical fiber is greater than 7.60[log(poise)] at the $T_s$. In this case, the maximum value $V_0$[log(poise)] of viscosity distribution may be greater than 7.90[log(poise)].

The prefrom comprises a multi layer structure of which an outside area of the clad has more than two layers and has a high viscosity clad layer of which at least at one temperature viscosity is greater than viscosity of the inner clad layer of the most inside area in the outside area at the temperature $T_s$, among the clad layers outside the inner clad layer. Preferably an outside low viscosity clad layer of which viscosity is smaller than $V_0$ at the temperature $T_s$, is the most outside of the clad. In addition, viscosity of surface of the preform at the temperature $T_s$ is preferably lower than $V_0$.

On the other hand, the clad of the outside are a may be comprised of two layers, that is, an inner clad layer and a high viscosity clad layer.

A synthetic quartz glass may be used as the inner clad layer, and a quartz glass, for example such as a native quartz or a crystallization synthetic quartz glass, containing crystal type silica may be used as the high viscosity clad layer.

Furthermore the preform may be manufactured by using the synthetic quartz glass having the lower viscosity than a pure synthetic quartz glass by doping at least with one dopant, among chlorine, germanium, fluorine, and phosphorus as the inner clad layer and using the synthetic quartz glass having higher viscosity than the inner clad layer by not doping or doping with small amount of dopant as the high viscosity clad layer. In addition, a portion containing at least the core and the inner clad layer may be formed by VAD method, OVD method, MCVD method, and PCVD method, or by appropriate combination of them.

According to another aspect of the invention, a method for manufacturing the preform includes steps of covering circumference of the rod at least the core and the inner clad layer with a tube containing at least the high viscosity clad layer, and unifying the rod and the tube by heating and contracting the tube or by heating glass grain while depositing the glass grain which forms the high viscosity clad layer. In addition, plasma flame is preferably used at this heating.

The preform may be manufactured by forming a porous preform by depositing glass particles generated by a flame hydrolysis of a glass crude material containing silicon on the circumference of the rod comprising at least the core and the inner clad layer, and forming the high viscosity clad layer by vitrifying the porous preform at temperature between 1400 and 1600° C. after dehydrating the porous preform in atmosphere containing dehydration gas at temperature range between 900 and 1200° C. In this case, chlorine gas is used as the dehydration gas.

Furthermore the method for manufacturing preform comprises covering circumference of the rod comprising at least the core, the inner clad layer, and the high viscosity clad layer with the tube containing at least the outside low viscosity clad layer, and unifying the rod and the tube by heating and contracting the tube. The preform may be manufactured by forming the outside low viscosity clad layer by depositing glass particles generated by flame hydrolysis of glass crude material containing silicon on the circumference of the rod.

Furthermore the method for manufacturing the preform may comprise covering circumference of the rod comprising at least the core and the inner clad layer with the tube containing the high viscosity clad layer, and unifying the rod and the tube by heating and contracting the tube, while forming the outside low viscosity clad layer by depositing glass particles generated by flame hydrolysis of glass crude material containing silicon. The method may comprise covering circumference of the rod comprising at least the core and the inner clad layer with the tube containing at least the high viscosity clad layer and the outside low viscosity clad layer, and unifying the rod and the tube by heating and contracting the tube.

The optical fiber of which the transmission loss at wavelength of 1385 nm is equal to or less than 0.35 dB/km, preferably equal to or less than 0.30 dB/km, is obtained by heating and drawing the above-mentioned preform.

The transmission loss of the optical fiber at wavelength of 1385 nm is equal to or less than 0.35 dB/km in case that the fiber is exposed to atmosphere containing 1% hydrogen for four days, and does not substantially change compared with the transmission loss at wavelength of 1385 nm before exposed to the atmosphere.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
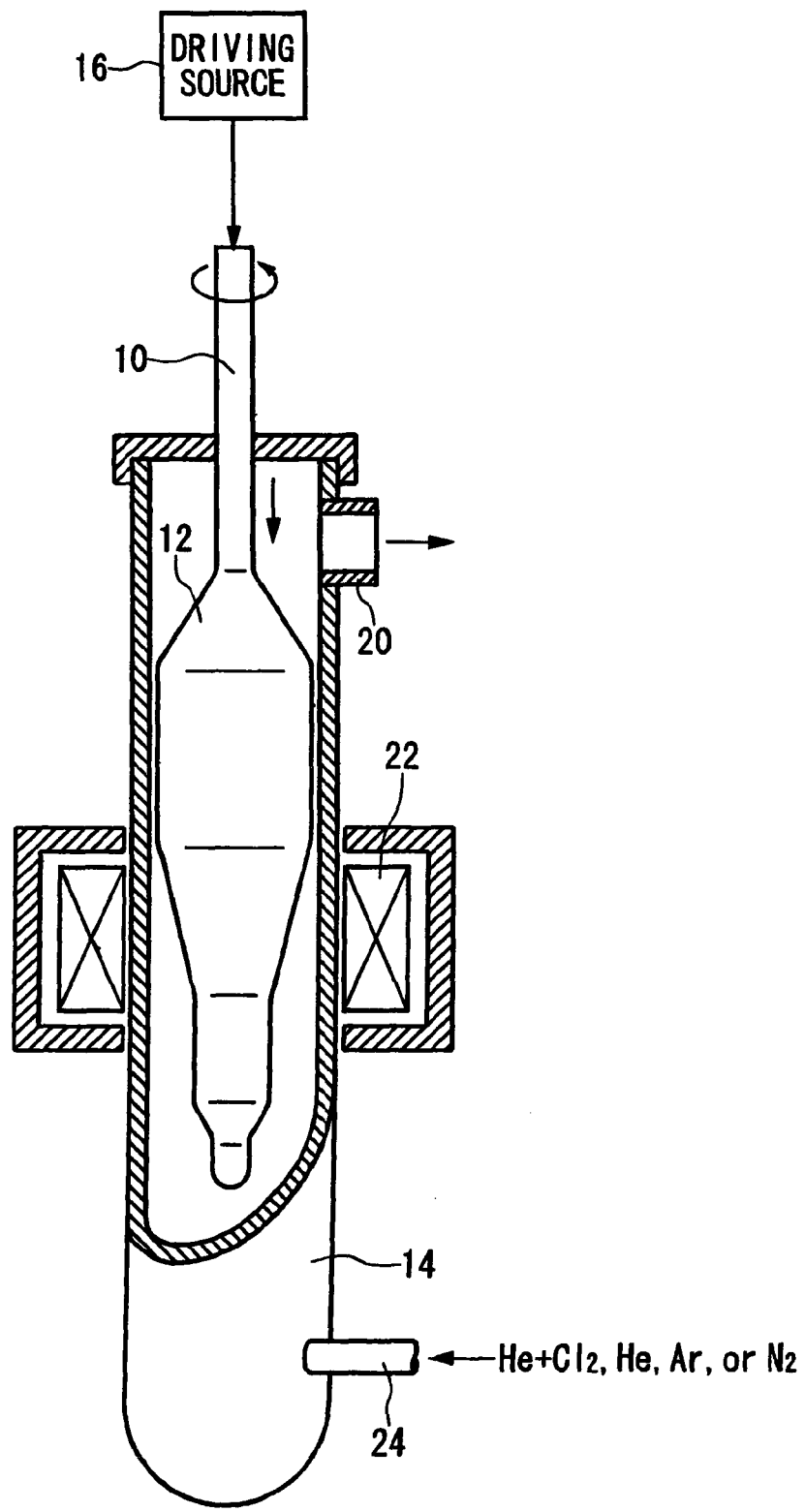
FIG. 1 is a partially cut-out view showing an example of the conventional configuration of an optical fiber preform sintering apparatus.
Figure 2:
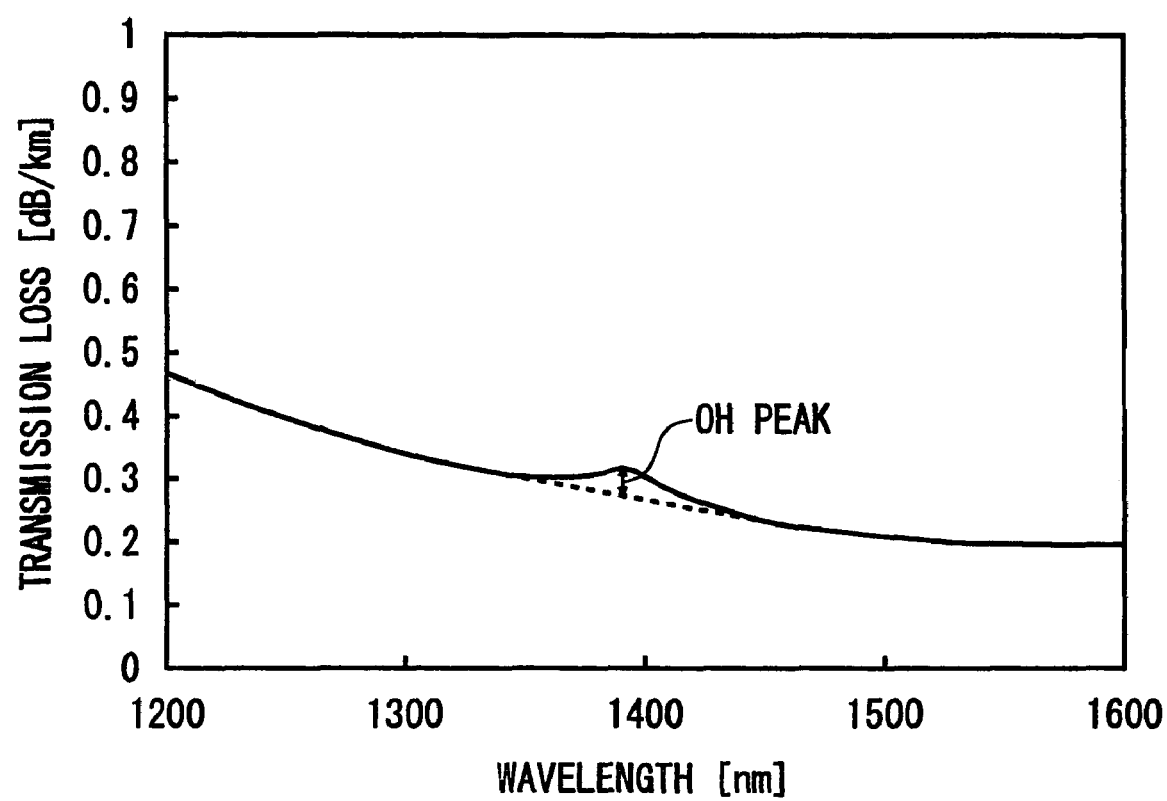
FIG. 2 is a graphic chart showing relationship between the transmission loss and wavelength in a general single mode optical fiber.
Figure 3:
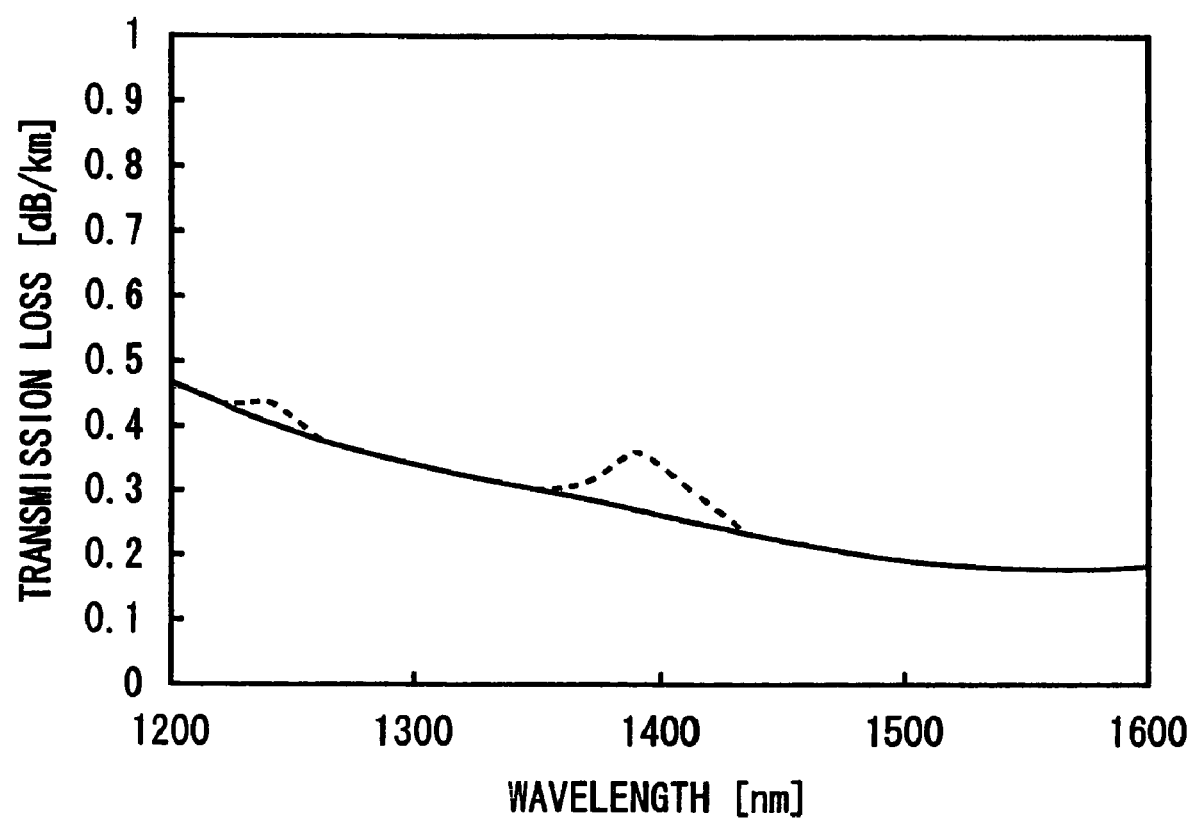
FIG. 3 is a graphic chart showing relationship between the transmission loss and wavelength of the fiber being exposed to hydrogen atmosphere.
Figure 4:
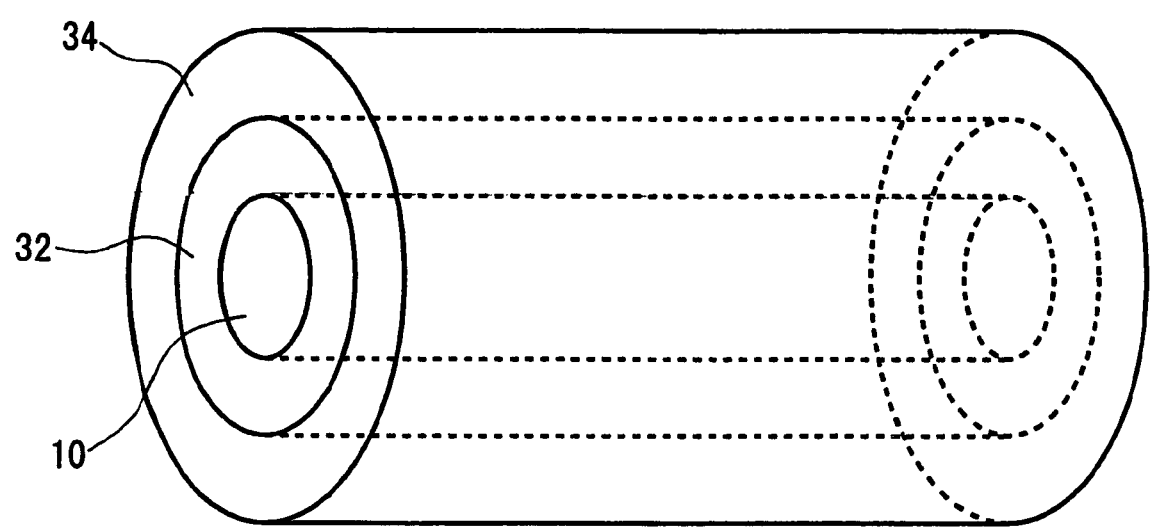
FIG. 4 shows an example of a preform 200 manufactured by the sintering apparatus to which the invention is applied.

FIG. 4 shows an example of a preform 200 manufactured by the sintering apparatus 100 shown in FIG. 1. A preform 200 has a cylindrical core 10, made from quartz doped with germanium, and a first, inner clad 32, made from quartz, formed around the outside surface of the core 10.

A second, outer clad 34 may be formed around the outside surface of the preform 200 to increase the thickness of the clad 32. The content of the OH group in the preform 200 is substantially 0.8 ppb or less. Moreover, the amount of projection of the OH peak in the curve that shows the transmission loss of the light of the optical fiber, which is obtained by drawing the preform 200, is substantially 0.05 dB/km or less. Therefore, the optical fiber obtained from the preform 200 can be used for light transmission in the wavelength band from 1300 nm to 1600 nm.

According to the present invention, even if the optical fiber pulled from the preform is exposed to hydrogen atmosphere, the rise of the transmission loss (OH peak) at wavelength of 1385 nm is suppressed by controlling radial viscosity distribution around softening temperature of the preform.

If the optical fiber is exposed to hydrogen atmosphere, hydrogen diffuses into the optical fiber, and then hydrogen reacts with the defect existing in the glass of the optical fiber, and then the OH peak rises due to the generation of the OH group.

Such a defect does not exist in the preform at the beginning, but many of which are generated during the drawing process with rapid change of the shape under the temperature of about 2000° C. If the conventional preform is pulled, sensitivity to hydrogen of the OH peak changes greatly according to the condition of the drawing process.

On the other hand, the preform of the present invention is that the maximum value $V_0$[log(poise)] of radial viscosity distribution of the optical fiber is greater than 7.60[(log (poise)] at the temperature $T_s$, defined as temperature at which the maximum value $V_0$[log(poise)] of radial viscosity distribution of the optical fiber in an inside area is 7.60[log (poise)] in an inside and an outside area equivalent to two times of mode field diameter, in which light at wavelength of 1385 nm propagates in the optical fiber obtained by drawing the preform.

Therefore the optical fiber obtained by drawing the preform of the present invention has a superior characteristic that rise of the OH peak is suppressed remarkably without depending on the condition of the drawing process.

This temperature $T_s$ is about 1600° C. in the case of a normal single mode fiber in which quartz glass doped with germanium (Ge), is used as a core.

When the preform manufactured in this manner is drawn, since viscosity of the outside area is relatively greater than the inside area, drawing stress at the inside area is smaller than drawing stress at the outside area, so generation of the defect in the inside area is suppressed. On the other hand, although many defects are generated at the outside area, since the majority of the light propagates through the inside area, the rise of the OH peak is hardly recognized, even if hydrogen diffuses into the optical fiber.

Generally in the case of the single mode fiber of which the core is doped with Ge, unless the clad is doped with a dopant to adjust a viscosity, since the viscosity of the clad becomes greater than a viscosity of the core and generally composition is substantially constant in a radial direction, the above mentioned viscosity distribution is not obtainable.

According to the present invention, the above-mentioned viscosity distribution is achieved by having more than two layers as the clad in the outside area, lowering viscosity of the inner clad layer of the most inside layer in the outside area, and forming a high viscosity layer by heightening viscosity of at least one of the other clad layers. While the fiber normally has two layers including an inner clad layer of low viscosity and a high viscosity clad layer, it may have three layers as mentioned below according to viscosity and thickness of the high viscosity clad layer.

In the inside area equivalent to two times of mode field diameter, maximum value $V_0$[log(poise)] of radial viscosity distribution outside the inside area, is preferably equal to or more than 7.90[log(poise)] at the temperature $T_s$ at which the maximum value of radial viscosity distribution is 7.60[log (poise)], so that the desired effect of the invention can be realized.

The clad has two layers structure comprising the inner clad layer and the high viscosity clad, if diameter of the inner clad layer is less than 80% of outer diameter of the preform and $V_0$=7.90, rise of the OH peak is equal to or less than about 0.03 dB/km.

Although outer diameter of the inner clad is preferably small to suppress rise of the OH peak due to hydrogen, in case that a glass used for the high viscosity clad layer is material of which the possibility of increasing the transmission loss remarkably is high like a native quartz glass, unless the outer diameter is sufficiently large (about six times of the mode field diameter), the initial loss may be large.

In the case of for example manufacturing the preform comprising a synthetic quartz glass inside of the preform and a native quartz glass outside of the preform, an upper limit of $V_0$ is about 9.0. On the other hand, in the case of doping glass of the inside area with a large amount of dopant, an upper limit of $V_0$ can be larger than 9.0, and influences such as the transmission loss caused by doping, can not be defined sweepingly because the influence largely depends on the composition.

In case of the most outside layer being the high viscosity clad layer, a problem that strength of the optical fiber becomes lower, may occur by residual stress of the surface of the optical fiber changing to tensile stress. For example if heightening $V_0$ and thinning the high viscosity clad layer, rise of the OH peak and the initial loss are advantageously suppressed, but residual tensile stress of the surface of the optical fiber becomes large and snapping of the fiber can be caused during the drawing, winging back, or proof test.

To reduce this kind of residual tensile stress of the surface of the optical fiber, residual tensile stress of the surface can be reduced or be changed to compressive stress, and strength of the optical fiber can be improved by adding an outside low viscosity clad layer of which viscosity is lower than the high viscosity clad layer to outside of the high viscosity clad layer. If viscosity of the outside low viscosity clad layer at the temperature $T_s$ is 7.60[log (poise)] equal to viscosity of the inner clad layer roughly, strength of the optical fiber is improved sufficiently.

Viscosity can be distributed in radial direction of the preform by changing quality of glass material composing the inner clad layer and the high viscosity clad layer.

The synthetic quartz glass used for the preform for the conventional optical fiber includes amorphous structure manufactured by oxidizing or hydrolyzing by flame glass crude material gas such as silicon tetrachloride. On the other hand, in the native quartz glass manufactured by heating and fusing the native quartz, there are many microcrystals of cristobalite type helix originating from the nature of quartz and quartz type helix that cristobalite type is dislocated in the amorphous structure. Because these microcrystals suppress flow of glass, the native quartz glass has higher viscosity than the synthetic quartz glass.

A crystallization quartz glass manufactured by depositing microcrystal in the synthetic quartz glass has higher viscosity than a conventional synthetic quartz glass. In addition, viscosity of the crystallization quartz glass can be lower easily by doping the synthetic quartz glass with many kind of dopant. Generally, even if the transmission loss rises by doped with a dopant due to absorption of ultraviolet rays, infrared rays, or the like, the dopant such as chlorine, germanium, fluorine, phosphorus, and the like does not cause so large rise of the loss at wavelength range between 1300 to 1600 nm which is normally used for the optical fiber communication, so these dopant are preferably used.

In these dopant, by suppressing the defects being generated in the portion that light propagates in the optical fiber by heightening inside viscosity and lowering outside viscosity by using glasses having different viscosity, rise of the OH peak at which the optical fiber exposed to hydrogen atmosphere is remarkably suppressed.

To manufacture the core and the clad around the core, conventional VAD method, OVD method, MCVD method, and PCVD method, or by the combination of them can be adopted. Because (1) high purity is needed due to influence on the large transmission loss and (2) viscosity is needed to be low preferably, the synthetic quartz glass or the synthetic quartz glass doped with a dopant to lower viscosity is preferably used for the inner clad layer, and the inner clad layer can be formed as an extension of clad portion of the inside area.

The first method covering outside of a rod containing the core portion and the inner clad layer with the high viscosity clad layer having high viscosity comprises unifying the rod and a tube by placing the rod in the tube containing the high viscosity clad layer and contracting the rod by heating form outside. In this case, oxyhydrogen flame, electric furnace, plasma torch, or the like can be used as a heating source.

The second method comprises unifying the rod and glass grain by heating while depositing on the circumference of the above-mentioned rod by scattering the glass grain composing the high viscosity clad layer. In this case, plasma torch is preferably used as the heating source.

The third method covering the rod with the high viscosity clad layer is OVD method that includes forming the porous preform by depositing glass particles manufactured by flame hydrolysis of the glass crude material containing silicon on the circumference of the above-mentioned rod, and a dehydrating porous preform at the temperature range between 900 and 1200° C. in the atmosphere containing dehydration gas such as chlorine or the like, and then forming the high viscosity clad layer by vitrifying in the atmosphere at the temperature between 1400 and 1600° C. In this case, because the high viscosity clad layer changes into the synthetic quartz glass, the inner clad layer needs to be doped with dopant to lower its viscosity.

The first method covering outside of the high viscosity clad layer with the outside low viscosity clad layer includes covering the circumference of the rod with the tube containing at least the outside low viscosity clad layer, and unifying the rod and the tube by heating and contracting the tube.

The second method covering outside of the high viscosity clad layer with the outside low viscosity clad layer includes depositing glass particles manufactured by flame hydrolysis of glass crude material containing silicon on the circumference of the rod containing the high viscosity clad layer.

The first method covering outside of the inner clad layer with the high viscosity clad layer and the outside low viscosity clad layer, comprises covering the circumference of the rod comprising at least the core and the inner clad layer with the tube containing the high viscosity clad layer, and then covering the tube with the outside low viscosity clad layer by depositing glass particles manufactured by flame hydrolysis of glass crude material containing silicon, while unifying the rod and the tube by heating and contracting the tube.

Furthermore the first method covering outside of the inner clad layer with the high viscosity clad layer and the outside low viscosity clad layer, comprises covering the circumference of the rod comprising at least the core and the inner clad layer with the tube containing at least the high viscosity clad layer and the outside low viscosity clad layer, and unifying the rod and the tube by heating and contracting the tube.

Example 1

Figure 5:
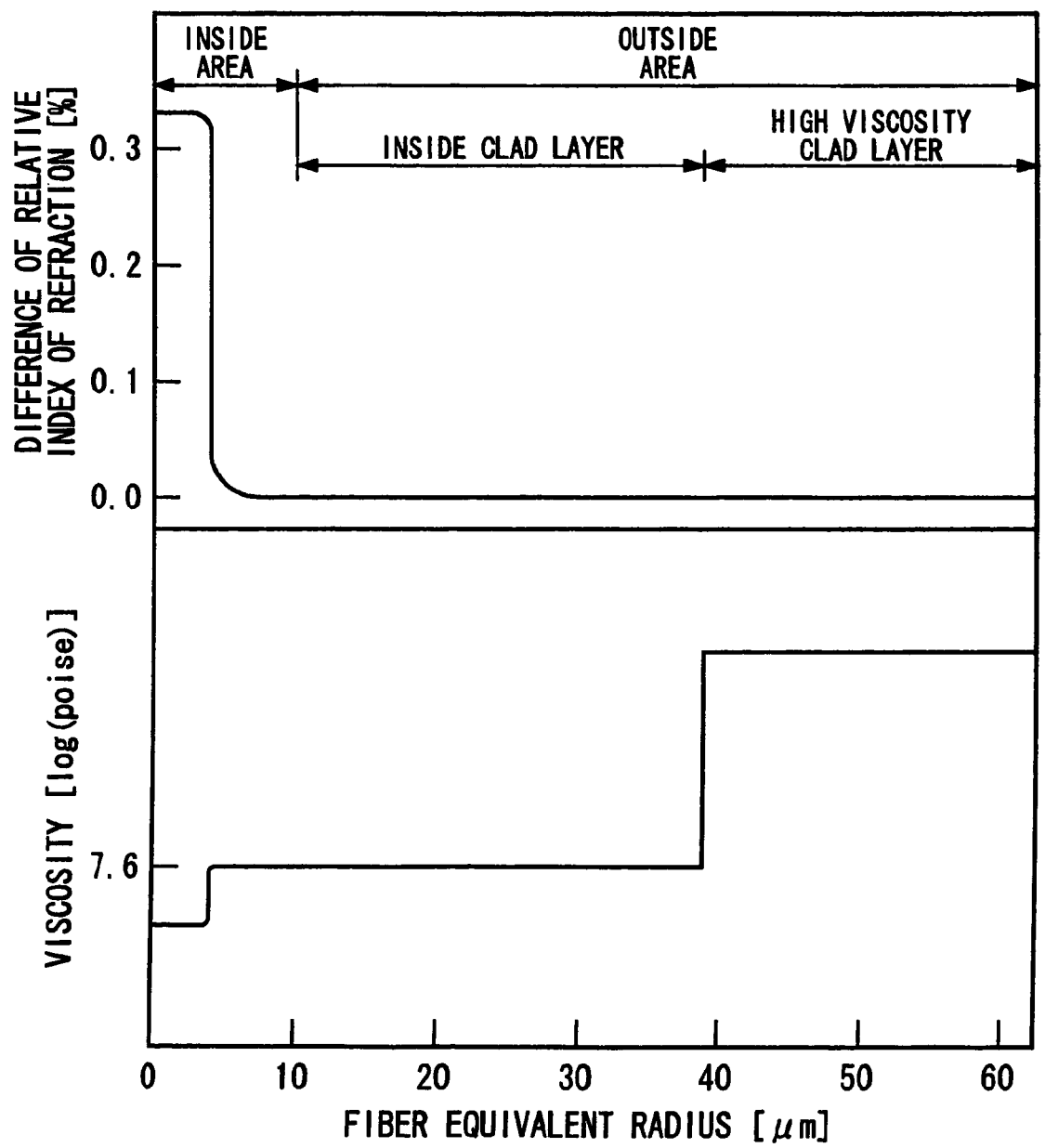
FIG. 5 is a graphic chart showing relationship between difference of relative index of refraction of the preform and radial viscosity distribution at the temperature $T_s$ in examples 1-7 of the present invention and a comparative example 4.

An step index type single mode optical fiber as shown in FIG. 5, of which outer diameter is 125 μm, difference of relative index of refraction is 0.34%, mode field diameter at wavelength of 1385 nm is 10 μm, is manufactured by forming clad of periphery of the core in inside area with glass which has the same composition as the inner clad layer in outside area, and drawing the preform having two layers of the inner clad layer and the high viscosity clad layer in outside area at drawing speed of 800 m/min and drawing tension of 1.4N.

Of the optical fiber, an outer diameter of the inner clad layer is 100 μm in terms of optical fiber diameter, thickness of the high viscosity clad layer is 12.5 μm in terms of optical fiber, viscosity $V_0$ of the high viscosity clad layer at the temperature $T_s$ is 7.9[log(poise)]. Rise of the OH peak of 0.03 dB/km is measured, after this optical fiber is exposed to atmosphere containing 1% hydrogen for four days.

Figure 6:
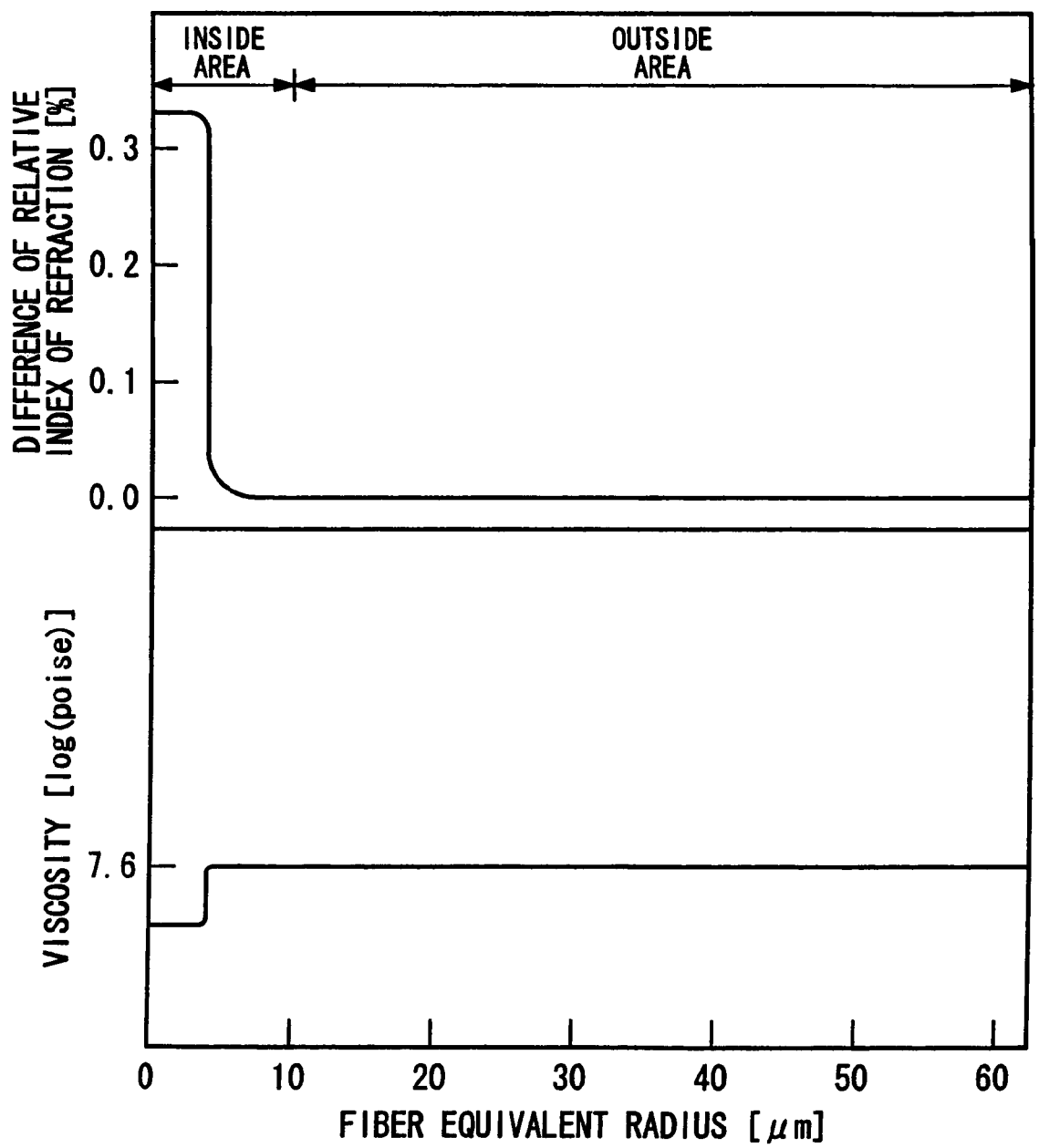
FIG. 6 is a graphic chart showing relationship between difference of relative index of refraction and radial viscosity distribution at the temperature $T_s$ in the preform as examples 1-3.
Figure 7:
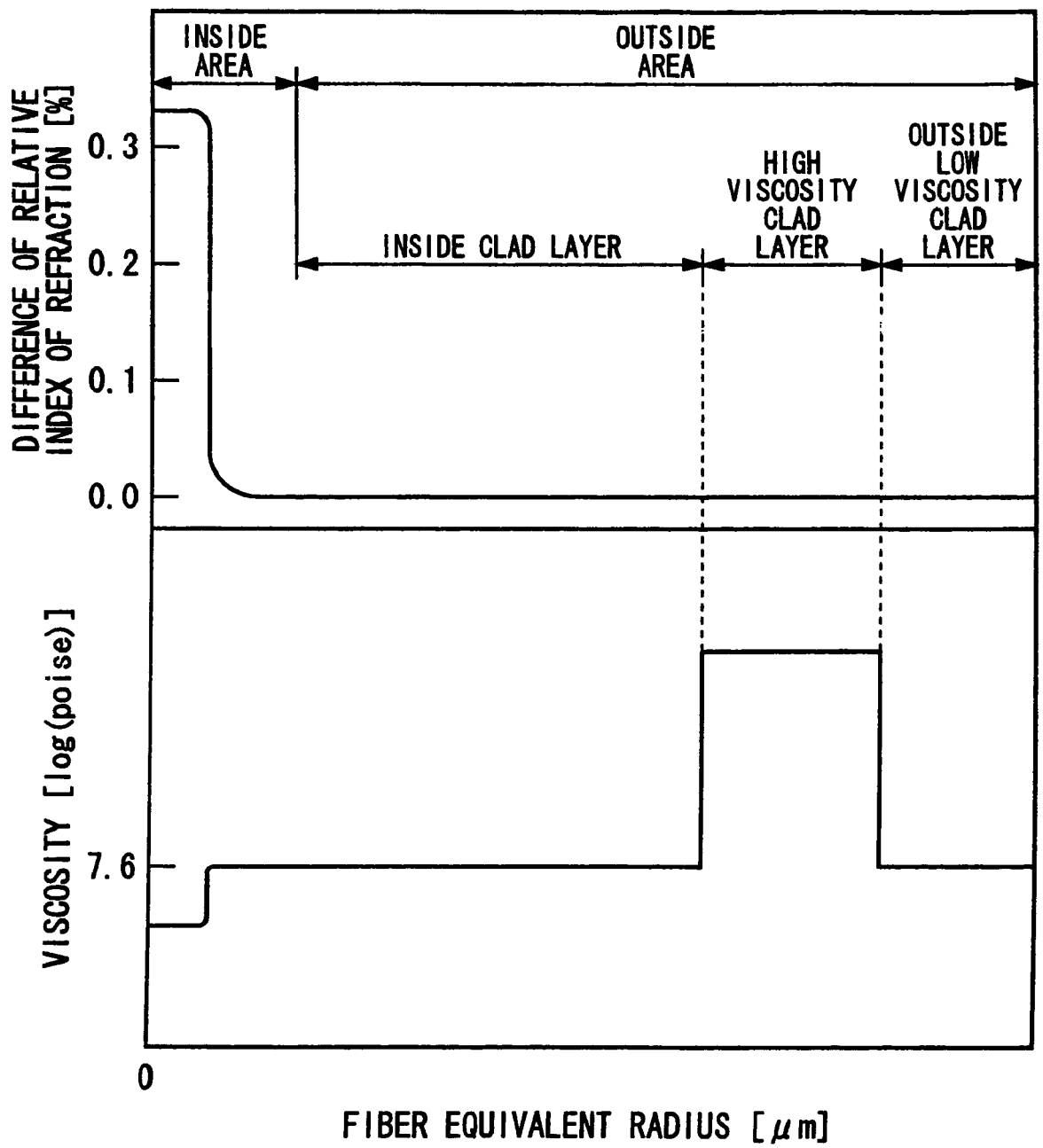
FIG. 7 is a graphic chart showing relationship between difference of relative index of refraction of the preform and radial viscosity distribution at the temperature $T_s$ as an example 8 of the present invention.

FIGS. 5 to 7 are graphs showing relationships of differences of relative index of refraction and radial viscosity distribution at the temperature $T_s$ of the preform, of which upper row is relationship of difference of relative index of refraction and structure, and the lower is relationship of viscosity and optical fiber equivalent radius.

Example 2

The step index type single mode optical fiber as shown in FIG. 5, of which outer diameter is 125 μm, difference of relative index of refraction is 0.34%, mode field diameter at wavelength of 1385 nm is 10 μm, is manufactured by forming clad of periphery of the core in the inside area with glass which has the same composition as the inner clad layer in outside area, and drawing the preform having two layers of the inner clad layer and the high viscosity clad layer in outside area at drawing speed of 800 m/min and drawing tension of 1.4N.

Of the optical fiber, an outer diameter of the inner clad layer is 90 μm in terms of optical fiber diameter, thickness of the high viscosity clad layer is 17.5 μm in terms of optical fiber, viscosity $V_0$ of the high viscosity clad layer at the temperature $T_s$ is 7.9[log(poise)]. Rise of the OH peak of 0.014 dB/km is measured, after this optical fiber is exposed to atmosphere containing 1% hydrogen for four days.

Example 3

The step index type single mode optical fiber as shown in FIG. 5, of which outer diameter is 125 μm, difference of relative index of refraction is 0.34%, mode field diameter at wavelength of 1385 nm is 10 μm, is manufactured by forming clad of periphery of the core in inside area with glass which has the same composition as the inner clad layer in outside area, and drawing the preform having two layers of the inner clad layer and the high viscosity clad layer in outside area at drawing speed of 800 m/min and drawing tension of 1.4N.

Of the optical fiber, an outer diameter of the inner clad layer is 80 μm in terms of optical fiber diameter, thickness of the high viscosity clad layer is 22.5 μm in terms of optical fiber, viscosity $V_0$ of the high viscosity clad layer at the temperature $T_s$ is 7.9[log(poise)]. After this optical fiber is exposed to atmosphere containing 1% hydrogen for four days, rise of the OH peak is measured, but no rise is recognized at all.

Example 4

The step index type single mode optical fiber as shown in FIG. 5, of which outer diameter is 125 μm, difference of relative index of refraction is 0.34%, mode field diameter at wavelength of 1385 nm is 10 μm, is manufactured by forming clad of periphery of the core in inside area with glass which has the same composition as the inner clad layer in outside area, and drawing the preform having two layers of the inner clad layer and the high viscosity clad layer in outside area at drawing speed of 800 m/min and drawing tension of 1.4N.

Of the optical fiber, an outer diameter of the inner clad layer is 35 μm in terms of optical fiber diameter, thickness of the high viscosity clad layer is 45 μm in terms of optical fiber, viscosity $V_0$ of the high viscosity clad layer at the temperature $T_s$ is 7.9[log(poise)]. After this optical fiber is exposed to atmosphere containing 1% hydrogen for four days, rise of the OH peak is measured, but no rise is recognized at all.

Example 5

The step index type single mode optical fiber as shown in FIG. 5, of which outer diameter is 125 μm, difference of relative index of refraction is 0.34%, mode field diameter at wavelength of 1385 nm is 10 μm, is manufactured by forming clad of periphery of core in inside area with glass which has the same composition as the inner clad layer in outside area, and drawing the pre-form having two layers of the inner clad layer and the high viscosity clad layer in outside area at drawing speed of 800 m/min and drawing tension of 1.4N.

Of the optical fiber, an outer diameter of the inner clad layer is 80 μm in terms of optical fiber diameter, thickness of the high viscosity clad layer is 22.5 μm in terms of optical fiber, viscosity $V_0$ of the high viscosity clad layer at the temperature $T_s$ is 8.5[log(poise)]. After this optical fiber is exposed to atmosphere containing 1% hydrogen for four days, rise of the OH peak is measured, but no rise is recognized at all.

Comparative Example 1

The step index type single mode optical fiber as shown in FIG. 6, of which outer diameter is 125 μm, difference of relative index of refraction is 0.34%, mode field diameter at wavelength of 1385 nm is 10 μm, is manufactured by drawing a normal pre-form that the whole of clad is formed with the same material as clad of periphery of the core at drawing speed of 800 m/min and drawing tension of 1.4N.

Rise of the OH peak of 0.105 dB/km is measured, after this optical fiber is exposed to atmosphere containing 1% hydrogen for four days.

Example 6

The step index type single mode optical fiber as shown in FIG. 5, of which outer diameter is 125 μm, difference of relative index of refraction is 0.34%, mode field diameter at wavelength of 1385 nm is 10 μm, is manufactured by forming clad of periphery of core in inside area with glass which has the same composition as the inner clad layer in outside area, and drawing the pre-form having two layers of the inner clad layer and the high viscosity clad layer in outside area at drawing speed of 500 m/min and drawing tension of 1.4N.

Of the optical fiber, an outer diameter of the inner clad layer is 100 μm in terms of optical fiber diameter, thickness of the high viscosity clad layer is 12.5 μm in terms of optical fiber, viscosity $V_0$ of the high viscosity clad layer at the temperature $T_s$ is 7.9[log(poise)]. Rise of the OH peak of 0.011 dB/km is measured, after this optical fiber is exposed to atmosphere containing 1% hydrogen for four days.

Comparative Example 2

The step index type single mode optical fiber as shown in FIG. 6, of which outer diameter is 125 μm, difference of relative index of refraction is 0.34%, mode field diameter at wavelength of 1385 nm is 10 μm, is manufactured by drawing the normal optical fiber pre-form that the whole of clad is formed with the same material as clad of periphery of the core at drawing speed of 500 m/min and drawing tension of 1.4N.

Rise of the OH peak of 0.060 dB/km is measured, after this optical fiber is exposed to atmosphere containing 1% hydrogen for four days.

Example 7

The step index type single mode optical fiber as shown in FIG. 5, of which outer diameter is 125 μm, difference of relative index of refraction is 0.34%, mode field diameter at wavelength of 1385 nm is 10 μm, is manufactured by forming clad of periphery of core in inside area with glass which has the same composition as the inner clad layer in outside area, and drawing the pre-form having two layers of the inner clad layer and the high viscosity clad layer in outside area at drawing speed of 150 m/min and drawing tension of 1.4N.

Of the optical fiber, an outer diameter of the inner clad layer is 100 μm in terms of optical fiber diameter, thickness of the high viscosity clad layer is 12.5 μm in terms of optical fiber, viscosity $V_0$ of the high viscosity clad layer at the temperature $T_s$ is 7.9[log(poise)]. After this optical fiber is exposed to atmosphere containing 1% hydrogen for four days, rise of the OH peak is measured, but no rise is recognized at all.

Comparative Example 3

The step index type single mode optical fiber as shown in FIG. 6, of which outer diameter is 125 μm, difference of relative index of refraction is 0.34%, mode field diameter) at wavelength of 1385 nm is 10 μm, is manufactured by drawing the normal optical fiber pre-form that the whole of clad is formed with the same material as clad of periphery of the core at drawing speed of 150 m/min and drawing tension of 1.4N.

Rise of the OH peak of 0.042 dB/km is measured, after this optical fiber is exposed to atmosphere containing 1% hydrogen for four days.

Example 8

The step index type single mode optical fiber as shown in FIG. 7, of which outer diameter is 125 μm, difference of relative index of refraction is 0.34%, mode field diameter at wavelength of 1385 nm is 10 μm, is manufactured by forming clad of periphery of core in inside area with glass which has the same composition as the inner clad layer in outside area, and drawing the pre-form having three layers of the inner clad layer, the high viscosity clad layer, and the outside low viscosity clad layer in outside area at drawing speed of 800 m/min and drawing tension of 1.4N.

Of the optical fiber, an outer diameter of the inner clad layer is 105 μm in terms of optical fiber diameter, thickness of the high viscosity clad layer is 7 μm in terms of optical fiber, thickness of the outside low viscosity clad layer is 3 μm in terms of optical fiber, viscosity $V_0$ of the high viscosity clad layer at the temperature $T_s$ is 8.5[log (poise)], viscosity $V_t$ of the outside low viscosity clad layer at the temperature $T_s$ is 7.6[log (poise)]. 1% proof test on the optical fiber is conducted, but no disconnection of fiber is found. Furthermore after this optical fiber is exposed to atmosphere containing 1% hydrogen for four days, rise of the OH peak is measured, but no rise is recognized at all.

In addition, in the present example the reason why there are no disconnection of the fiber regardless of thickness of the high viscosity clad layer of 7 μm is because the outside low viscosity clad layer is formed the most outside of the clad.

Comparative Example 4

The step index type single mode optical fiber as shown in FIG. 5, of which outer diameter is 125 μm, difference of relative index of refraction is 0.34%, mode field diameter at wavelength of 1385 nm is 10 μm, is manufactured by forming clad of periphery of core in inside area with glass which has the same composition as the inner clad layer in outside area, and drawing the pre-form having two layers of the inner clad layer and the high viscosity clad layer in outside area at drawing speed of 800 m/min and drawing tension of 1.4N.

Of the optical fiber, an outer diameter of the inner clad layer is 111 μm in terms of optical fiber diameter, thickness of the high viscosity clad layer is 7 μm in terms of optical fiber, viscosity V0 of the high viscosity clad layer at the temperature Ts is 8.5[log(poise)]. In the case of winding back operation this optical fiber, the optical fiber breaks, and many breakage inside of remaining optical fiber are also recognized. Because the outside low viscosity clad layer is not formed on the most outside of the clad, the optical fiber is broken.

In addition, the results explained above as examples 1-8 and comparative examples 1-4 are shown below as table 1.

TABLE 1

| | $V_0$ log (poise) | Inner clad diameter μm | Thickness of high viscosity clad μm | Thickness of outside low viscosity clad μm | Drawing tension N | Drawing speed m/min | OH peak rise dB/km |
|---|---|---|---|---|---|---|---|
| Example 1 | 7.9 | 100 | 12.5 | 0 | 1.4 | 800 | 0.03 |
| Example 2 | 7.9 | 90 | 17.5 | 0 | 1.4 | 800 | 0.014 |
| Example 3 | 7.9 | 80 | 22.5 | 0 | 1.4 | 800 | no rise |
| Example 4 | 7.9 | 35 | 45 | 0 | 1.4 | 800 | no rise |
| Example 5 | 8.5 | 80 | 22.5 | 0 | 1.4 | 800 | no rise |
| Comparative example 1 | 7.6 | 125 | 0 | 0 | 1.4 | 800 | 0.105 |
| Example 6 | 7.9 | 100 | 12.5 | 0 | 1.4 | 500 | 0.011 |
| Comparative example 2 | 7.6 | 125 | 0 | 0 | 1.4 | 500 | 0.060 |
| Example 7 | 7.9 | 100 | 12.5 | 0 | 1.4 | 150 | no rise |
| Comparative example 3 | 7.6 | 125 | 0 | 0 | 1.4 | 150 | 0.042 |
| Example 8 | 8.5 | 105 | 7 | 3 | 1.4 | 800 | no rise |
| Comparative example 4 | 8.5 | 111 | 7 | 0 | 1.4 | 800 | break |

As clear from the above explanation, according to the present embodiment, even if the optical fiber obtained by drawing the pre-form is exposed to hydrogen atmosphere, the OH peak in the fiber at wavelength about 1385 nm hardly rises regardless of condition of drawing.

Although the present invention has been described by way of exemplary embodiments, it should be understood that those skilled in the art might make many changes and substitutions without departing from the spirit and the scope of the present invention which is defined only by the appended claims.

What is claimed is:

1. A method for manufacturing a preform having a core and a multilayer clad, comprising:
    covering a circumference of a rod comprising at least said core and an inner clad layer with a first tube comprising at least a high viscosity clad layer; and
    unifying said rod and said first tube by heating and contracting said first tube,
    wherein said inner clad layer comprises synthetic quartz glass and said high viscosity clad layer comprises a crystallization quartz glass which is formed by depositing microcrystal in synthetic quartz glass.

2. A method for manufacturing a preform as claimed in claim 1, further comprising:
    covering said circumference of said rod covered with the first tube with a second tube comprising at least an outside low viscosity clad layer; and
    unifying said rod covered with the first tube and said second tube by heating and contracting said second tube.

3. A method for manufacturing a preform as claimed in claim 1, further comprising:
    forming an outside low viscosity clad layer by depositing glass particles produced by flame hydrolysis of glass crude material comprising silicon, on the circumference of said rod covered with the first tube.

4. A method for manufacturing a preform as claimed in claim 3, wherein said forming said outside low viscosity clad layer is performed during said unifying said rod and said first tube.

5. A method for manufacturing a preform as claimed in claim 1, wherein said first tube further comprises an outside low viscosity clad layer.

6. A method for manufacturing a preform having a core and a multilayer clad, comprising:
    providing a rod comprising a core and an inner clad layer which comprises synthetic quartz glass;
    providing a first tube comprising a high viscosity clad layer which comprises crystallization quartz glass formed by depositing microcrystal in a synthetic quartz glass;
    inserting said rod into said first tube; and
    unifying said rod and said first tube by heating and contracting said first tube.

7. A method for manufacturing a preform as claimed in claim 6, further comprising:
    inserting the unified rod and first tube into a second tube comprising an outside low viscosity clad layer; and
    unifying said unified rod and first tube with said second tube by heating and contracting said second tube.

8. A method for manufacturing a preform as claimed in claim 6, further comprising:
    forming an outside low viscosity clad layer on said unified rod and first tube by depositing glass particles produced by flame hydrolysis of glass crude material comprising silicon, on the unified rod and first tube.

9. A method for manufacturing a preform as claimed in claim 6, further comprising forming an outside low viscosity clad layer during said unifying said rod and said first tube.

10. A method for manufacturing a preform as claimed in claim 6, wherein said first tube further comprises an outside low viscosity clad layer.

11. A method for manufacturing a preform for an optical fiber, comprising:

providing a rod comprising a core and an inner clad layer which comprises synthetic quartz glass;

providing a first tube comprising a high viscosity clad layer which comprises crystallization quartz glass formed by depositing microcrystal in a synthetic quartz glass;

inserting said rod into said first tube;

unifying said rod and said first tube by heating and contracting said first tube;

forming an outside low viscosity clad layer on said high viscosity clad layer by one of:

inserting the unified rod and first tube into a second tube comprising an outside low viscosity clad layer, and unifying said unified rod and first tube with said second tube by heating and contracting said second tube; and depositing glass particles produced by flame hydrolysis of glass crude material comprising silicon, on the unified rod and first tube.

* * * * *